United States Patent [19]

Marlowe et al.

[11] 4,117,368
[45] Sep. 26, 1978

[54] MODULAR TYPE GUIDED BEAM FLAT DISPLAY DEVICE

[75] Inventors: Frank Jerome Marlowe, Kingston; Charles Hammond Anderson, Rocky Hill, both of N.J.

[73] Assignee: RCA Corporation, New York, N.Y.

[21] Appl. No.: 691,397

[22] Filed: Jun. 1, 1976

[51] Int. Cl.$^2$ .................... H01J 29/08; H01J 29/72; H01J 29/50
[52] U.S. Cl. .................................... 313/422; 315/366
[58] Field of Search ............... 313/495, 496, 497, 422, 313/413; 315/366

[56] References Cited

U.S. PATENT DOCUMENTS

| | | | |
|---|---|---|---|
| 2,717,329 | 9/1955 | Jones et al. | 358/133 X |
| 2,858,464 | 10/1958 | Roberts | 313/422 X |
| 3,379,912 | 4/1968 | Shanafelt | 313/422 |
| 3,904,923 | 9/1975 | Schwartz | 313/105 R X |
| 3,935,499 | 1/1976 | Oess | 313/413 |
| 4,028,582 | 6/1977 | Anderson et al. | 313/422 |

Primary Examiner—Robert Segal
Attorney, Agent, or Firm—G. H. Bruestle; D. S. Cohen; G. E. Haas

[57] ABSTRACT

An evacuated envelope has a rectangular display section and a gun section at one edge of the display section. The display section includes front and back walls which are generally rectangular, in closed spaced, parallel relation, and a plurality of spaced, parallel support walls between the front and back walls forming a plurality of parallel channels. The gun section extends across one end of the channels and includes therein gun structure which will direct electrons into the channels. In each of the channels is a beam guide which confines the electrons in a beam and guides the beam along the length of the channel. The beam guide also includes means for selectively deflecting the electron beam out of the guide at selective points along the guide so that the beam will impinge upon a phosphor screen along the inner surface of the front wall. In each of the channels is a scanning deflector which deflects the path of the beam as it passes from the guide to the phosphor screen so that each of the beams will scan a portion of the phosphor screen. The beams in each channel are scanned transversely across its portion of the screen in a transverse direction opposite to that of the beams in the adjacent channels.

10 Claims, 4 Drawing Figures

MODULAR TYPE GUIDED BEAM FLAT DISPLAY DEVICE

BACKGROUND OF THE INVENTION

The present invention relates to a guided beam type of flat display device wherein at least one and preferably each of a plurality of electron beams are scanned over a different area portion of an image screen. The invention relates particularly to a scan deflection structure for scanning each of the beams in one of its two orthogonal scan directions within its area portion of the screen.

As shown and described in the application for U.S. Patent of C. H. Anderson et al, Ser. No. 615,353, filed Sept. 22, 1975, entitled "Guided Beam Flat Display Device" now Pat. No. 4,028,562 issued June 7, 1977 one structure which has been proposed for a large area screen flat display device comprises a thin box-like envelope with one of the large sides thereof constituting a faceplate on which a phosphor screen is disposed. Within the envelope are a plurality of spaced, parallel support walls perpendicularly disposed to and between the large sides of the envelope forming a plurality of parallel channels. The support walls are typically of glass and serve to support the opposite large-area envelope walls against the compressive atmospheric pressure. Across one end of the channels is a gun structure which directs at least one electron beam along each of the channels. In each of the channels is a beam guide which confines the electron beam in the channel and guides the beam along the length of the channel. The beam guide also includes means for deflecting the electron beam out of the beam guide at selected points along the beam guide. The beams in all of the channels are simultaneously deflected out of the beam guides toward the phosphor screen at each of the selected points. Along the opposite walls at each side of each channel are deflection electrodes whereby each beam in each channel can be deflected transversely across the channel to achieve a line-by-line scanning of the phosphor screen.

In this display device the transverse movement of the beams is achieved by applying a positive potential to the deflection electrode at one side of each of the channels, e.g. the right side, and a negative potential to the deflection electrode at the other side of each of the channels, e.g. the left side. These potentials are generally in relation to the potential applied to the phosphor screen. This causes all of the beams in all of the channels to be deflected toward the deflection electrode which is at the positive potential, i.e. toward the right side of the channels. The potentials applied to the deflection electrode are then varied to cause each of the beams to simultaneously scan across the portion of the screen which transverses the respective channel.

A problem with this manner of operating the display device is that there is created a relatively high capacitance across each of the support walls between the deflection electrodes on opposite sides of each of the support walls. This capacitance is a result of the different potentials applied to the deflection electrodes on each side of each side wall, i.e. positive on one side and negative on the other, the thinness of the walls and the dielectric constant of the glass material of the walls. The high capacitance is undesirable since it produces a relatively high power dissipation by the scanning circuitry as a result of relatively high charging and discharging current needed to establish the required deflection voltage therefrom.

SUMMARY OF THE INVENTION

In an electron display device generally of the type described above, the beams in alternate channels are scanned across their respective channels in one transverse direction while the beams in the other channels are scanned across their respective channels in the opposite transverse direction.

DETAILED DESCRIPTION

Figure 1:
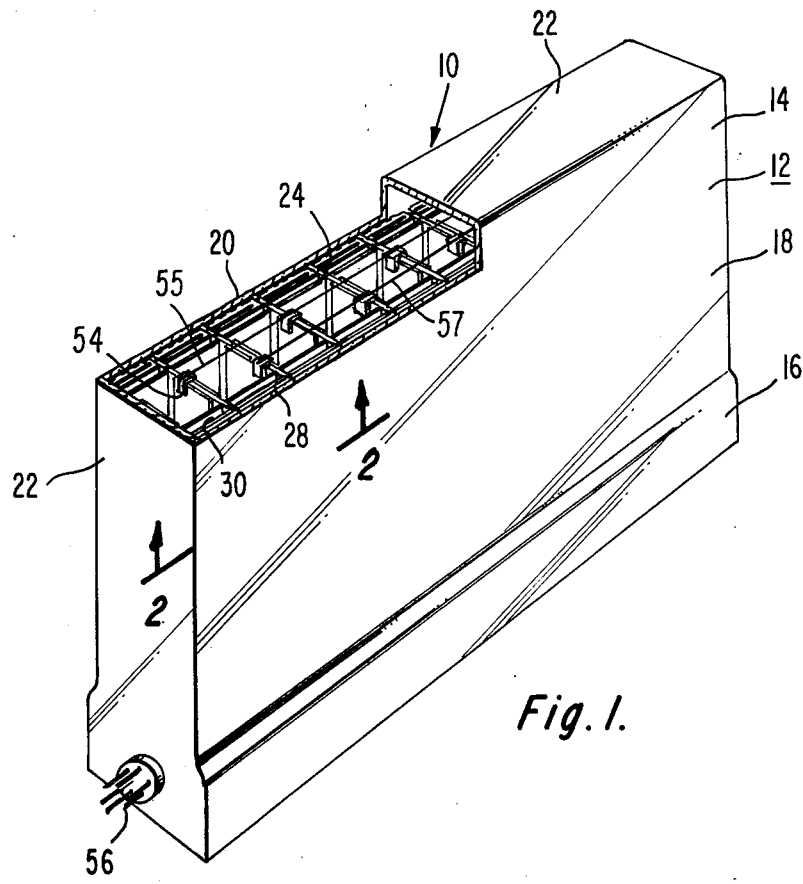
FIG. 1 is a perspective view of a guided beam flat display device of the present invention.

Referring to FIG. 1, a flat display device including the scan deflection structure of the present invention is generally designated as 10. The display device 10 comprises an evacuated envelope 12, typically of glass, having a display section 14 and an electronic gun section 16. The display section 14 includes a rectangular front wall 18 which is the viewing screen, and a rectangular back wall 20 in spaced parallel relation to the front wall 18. The front wall 18 and back wall 20 are connected by side walls 22. The front wall 18 and back wall 20 are dimensioned to correspond with the size of the viewing screen desired, e.g about 30 inches by 40 inches (75 cm by 100 cm) and are spaced apart typically about 1-3 inches (2.5 to 7.5 cm).

Figure 2:
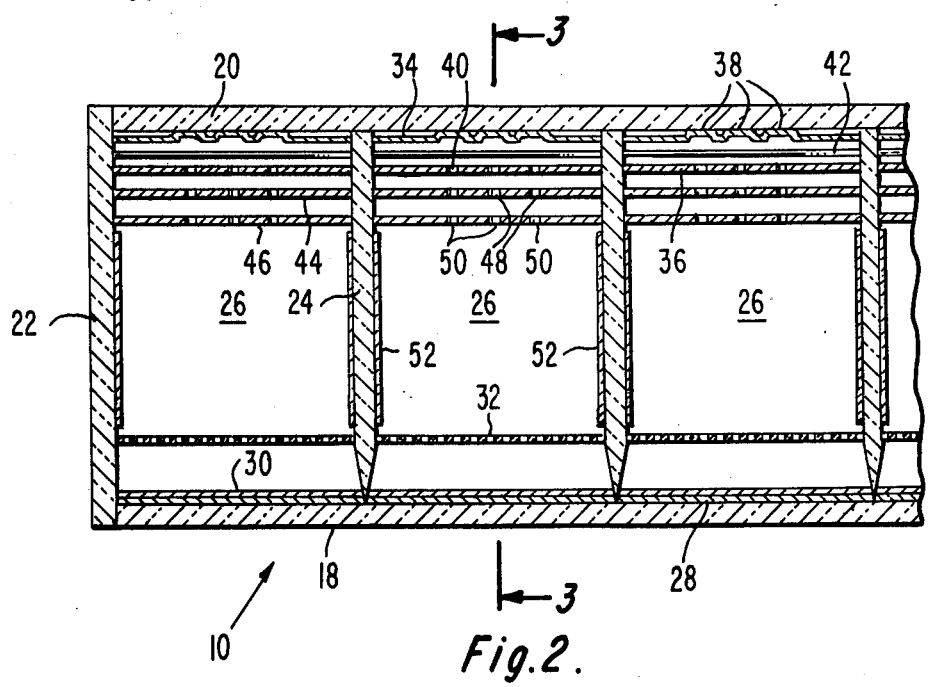
FIG. 2 is a sectional view of a portion of the display device taken along line 2—2 of FIG. 1.

As shown in FIG. 2, a plurality of spaced, substantially parallel, support walls 24, made of an electrically insulating material, such as glass, are secured between the front wall 18 and the back wall 20 and extend from the gun section 16 to the opposite side wall of the envelope 12. The support walls 24 provide the internal support for the evacuated envelope 12 against external atmospheric pressure, and divide the display section 14 into a plurality of channels 26. The edge of each of the support walls 24 which extends along the front wall 18 are tapered so as to provide a minimum area contact between the supporting walls 24 and the front wall 18.

On the inner surface of the front wall 18 is a phosphor screen 28. For a black and white display the phosphor screen 28 is of any well known composition used in black and white display devices. For a color display, the phosphor screen 28 is preferably made up of alternating strips of conventional phosphor compositions which emit red, green and blue when excited by electrons extending longitudinally along the channels. On the phosphor screen 28 is a film 30 of an electrically conductive metal, e.g. aluminum, which is transparent to electrons. For a color display, a shadow mask 32 extends across each of the channels 26 adjacent to but spaced from the phosphor screen 28. The shadow mask 32 is mounted on the supporting walls 24 and extend the full length of the channel 26. For a phosphor screen 28 made up of alternating strips, the shadow mask 32 includes rows of elongated slits such as described in U.S. Pat. No. 3,766,419 to R. L. Barbin, issued Oct. 16, 1973 entitled "Cathode-Ray Tube With Shadow Mask Having Random Web Distribution."

In each of the channels 26 adjacent to the back wall 20 is an electron beam guide. The electron beam guide may be of any construction which will guide one or more electron beams along a first path extending along the length of the channel and will allow deflection of the beam at spaced points along the channel into a second path extending towards the phosphor screen 28. As shown, the electron beam guides are of the type disclosed in the copending application of T. Credelle, Ser. No. 607,490, filed Aug. 25, 1975 entitled "Flat Display Tube With Beam Guide."

The electron beam guide includes a first metal ground plane 34 extending along the inner surface of the back wall 20, and a second metal ground plane 36 spaced from and substantially parallel to the first ground plane 34. The first metal ground plane 34 has three U-shaped troughs 38 which face the second ground plane 36 and which extend in parallel relation along the entire length of the channel 26. The first ground plane 34 may be made of a single sheet of a conductive metal or may be a plurality of metal strips extending in parallel relation across the channel 26 and spaced longitudinally along the channel.

The second ground plane 36 is of a sheet of an electrically conductive metal and has three rows of spaced holes 40 therethrough with each row of the holes being over a separate one of the troughs 38 in the first ground plane 34.

A plurality of wires 42 extend traversely across the channel 26 between the first and second ground planes 34 and 36. The wires 42 are transverse the longitudinal dimension of the channel and are in spaced parallel relation along the entire length of the channel 26. The wires are positioned between the holes 40 in the second ground plane 36.

A focus plate 44 extends across each of the channels 26 adjacent to but spaced from the second ground plane 36, and an acceleration plate 46 extends across each of the channels 26 adjacent to but spaced from the focus plate 44. The focus plate 44 and the acceleration plate 46 are of an electrically conductive metal and extend the full length of the channel 26. The focus plate 44 and the acceleration plate 46 each has three rows of holes 48 and 50 respectively therethrough with the holes 48 and 50 being in alignment with the holes 40 in the second ground plate 46.

In each of the channels 26 are a pair of spaced, substantially parallel deflection electrodes 52. The deflection electrodes 52 extend between the acceleration plate 46 and the shadow mask 32 along the entire length of the channel 26. Preferably, the deflection electrodes 52 are on the surfaces of the support walls 24 or side wall 22 which forms the sides of the particular channel 26. The deflection electrodes 52 which are on opposite sides of each support wall 24 are electrically connected together, such as by a U-shaped metal clip 54 which ends across the end of the support wall and contacting the deflection electrodes as shown in FIG. 1. The U-shaped metal clips 54 on alternate support walls 24, i.e. every other support wall, are electrically connected together by a bus wire 55, and the U-shaped metal clips 54 on the other support walls are electrically connected together by a bus wire 57.

Figure 3:
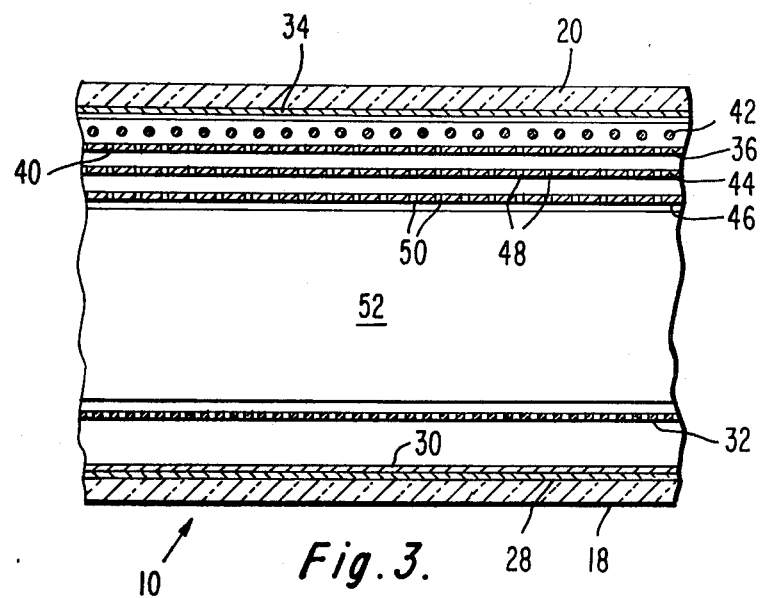
FIG. 3 is a sectional view of a portion of the display device taken along line 3—3 of FIG. 2.

The gun section of 16 of the envelope 12 is an extension of the display section 14 and extends along one set of adjacent ends of the channels 26. The gun section 16 may be of any shape suitable to enclose the particular gun structure contained therein. The electron gun structure contained in the gun section 16 may be of any well known construction suitable for selectively directing at least one beam of electrons along each of the channels 26. For example, the gun structure may comprise a plurality of individual guns, one being mounted at one end of each of the channels 26 for directing separate beams of electrons along each of the channels. For a color display device of the type shown if FIGS. 2 and 3, three electron beams are required along each of the channels 26 with each beam being directed along a separate one of the troughs 38 in the first ground plane 34 of the beam guide. However, for a black and white display device only a single beam is required for each channel.

Another type of gun structure which can be used includes a line cathode extending along the gun section 16 across the ends of the channels 26 and adapted to selectively direct individual beams of electrons along the channels. A gun structure of this type is described in U.S. Pat No. 2,858,464 to W. L. Roberts, issued Oct. 28, 1958, entitled "Cathode Ray Tube."

No matter what type of gun structure is used in the gun section 16, the gun structure should also include means for modulating the electron beams according to a video input signal. As shown in FIG. 1, a terminal 56 extends through a side wall 22 of the envelope 12. The terminal 56 includes a plurality of terminal wires by which the gun structure and other parts of the display within the envelope 12 can be electrically connected to suitable operating circuitry and power source outside of the envelope 12.

In the operation of the display device 10, the gun structure in the gun section 16 generates and directs at least one beam of electrons into each of the channels 26. For a color display device preferably three beams of electrons are directed into each of the channels 26. The electron beams are directed between the ground planes 34 and 36 of the beam guide with each beam being directed along a separate one of the troughs 38 in the first ground plane 34. In the beam guides, the ground planes 34 and 36 are at ground potential and the wires 42 are at a positive potential. As described in the previously referred to pending application of T. Credelle, this causes each of the electron beams to travel in an undulating path through the wires 42 and between the ground planes 34 and 36 along the entire length of the channel 26. The U-shape of the troughs 38 causes electrostatic forces to be applied to each of the electron beams as the beam passes between the wires 42 and the first ground plane 34 to confine the electrons of each beam between the sides of the troughs so that each beam will flow along a separate one of the troughs. Thus, each of the electron beams flows along a first path along its respective channel 26 from the gun section 16 to the side wall 22 of the envelope 12 opposite the gun section.

When the electron beams reach a selected point along the guide, the electron beams are deflected out of the first path into a second path extending toward the front wall 18 of the envelope 12. This can be achieved by switching the potential applied to the wire 42 adjacent the side wall 22 to a negative potential, or, if the first ground plane 34 is in the form of a plurality of parallel strips, by switching the potential applied to the strip adjacent the side wall 22 to a negative potential. The selected point of deflection out of the guide is progressively moved along the guide toward the electron gun end thereof to effect vertical scanning.

The deflected electron beams pass out of the beam guide through adjacent holes 40 in the second ground plane 36. The electron beams will then pass through the holes 48 in the focus plate 44 and the holes 50 in the acceleration plate 46. A potential positive with respect to the second ground plane 36 is applied to the focus plate 44 so as to focus the beams as they pass through the hole 48, and a potential also positive with respect to the second ground 36 and preferably the same potential as that on the metal film 30, is applied to the acceleration plate 46 so as to accelerate the flow of the beams as they pass through the holes 50. The electron beams will flow toward the phosphor screen 28 by a positive potential applied to the metal film 30 on the phosphor screen 28.

Figure 4:
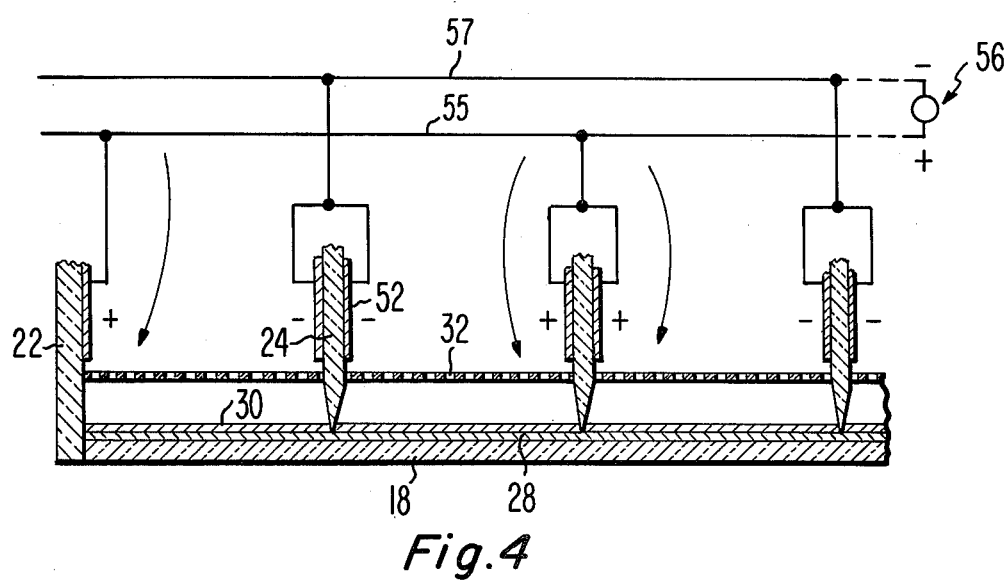
FIG. 4 is a schematic view illustrating the manner of achieving the transverse scanning of the beams.

As the electron beams flow along their second paths from the acceleration plate 46 to the phosphor screen 28, the electron beams pass between the deflection electrodes 52. As shown in FIG. 4, the deflection electrodes 52 are electrically connected to a source of electrical potential 56. The bus wire 55 is electrically connected to one polarity side of the source 56 and the bus wire 57 is electrically connected to the other polarity side of the source 56. Thus, the deflection electrodes on alternate support walls, i.e. every other support wall, are connected to the same polarity side of the source 56, e.g. the positive side, and the deflection electrodes on the other support walls are connected to the opposite polarity side of the source 56, e.g. the negative side. Therefore, although the deflection electrodes 52 which are at opposite sides of each channel 26 are of opposite polarity, the electrodes on opposite sides of each support wall 24 are of the same polarity.

Initially, one of the deflection electrodes 52 in each of the channels 26 is at a potential positive with respect to the potential applied to the metal film 30 on the phosphor screen 28 and the other of the deflection electrodes is at a potential negative with respect to the potential applied to the metal film 30. This causes the second paths of the electron beams in the channel to be deflected toward the deflection electrode which is at the positive potential. The potentials applied to the deflection electrodes 52 are such that the second paths of the electron beams are deflected sufficiently to cause the beams to initially impinge on the phosphor screen 28 adjacent to the supporting wall 24 on which is the positively charged deflection electrode 52. The potentials applied to the deflection electrodes 52 are varied in conventional manner by application of appropriate deflection signals thereto to effect a horizontal scanning of the beam across a portion of the screen equal to the width of a channel. By similarly deflecting the beams in each of the channels across its respective channel, an effectively continuous visual line will be created across the full width of the phosphor screen 28 to achieve a complete horizontal line scan of the phosphor screen.

Since in alternate channels 26, i.e. every other channel, the deflection electrode which is initially charged positive is on one side of the channel whereas in the other channels the initially positive charged deflection electrode is on the other side of the channels, the electron beams in each channel will be initially deflected transversely of the channel in one direction while the beams in each of the other channels will be deflected transversely of their channels in the opposite direction. When the potentials applied to the deflection electrodes are varied the beams in every other channel will be simultaneously scanned across their respective channels in opposite transverse directions to achieve the complete horizontal line scan of the phosphor screen. The horizontal scanning of the phosphor screen 28 is combined with the vertical scanning to produce a complete raster. As the beams are horizontally scanned, video information is simultaneously fed to the gun structure for each of the beams so as to modulate the beams. The video information for each horizontal scan may come from a storage register into which the information has been previously placed. By modulating the beams at the gun structure, a display can be achieved on the phosphor screen 28 which can be viewed through the front wall 18 of the display device.

Although the display device 10 has been described as having three beams directed along each of the channels 26 to achieve a color display, for a black and white display only one beam of electrons need be directed into the beam guide in each of the channels 26, and the shadow mask 32 would not be required. However, the display device would operate in the same manner as previously described with the single beam in each of the channels 26 being deflected out of its first path along the beam guide at a plurality of points along the channel into second paths toward the phosphor screen 28. As the beam passes between the deflection electrodes 52 the beam would be deflected transversely across the channel 26 to achieve line scans of the phosphor screen 28.

Although the present invention has been described with regard to a display device in which the beams of electrons are guided longitudinally along the channels before being deflected toward the phosphor screen at various points along the channel, it can be used in other forms of a display device wherein beams of electrons are directed through channels toward the phosphor screen and are deflected transversely across the channels by deflection electrodes to scan a portion of the screen. For example, the display device may include a plurality of channels extending from the back wall of the envelope to the phosphor screen on the front wall, a plurality of cathodes on the back wall for generating beams of electrons and directing the electrons through the channels and deflection electrodes on the walls of the channel for deflecting the electron beams transversely across the channels. One such display device is shown in U.S. Pat. No. 3,935,500 to F. G. Oess et al., issued Jan. 27, 1976 entitled "Flat CRT System."

We claim:

1. An electron display device comprising:
   an evacuated envelope having a front wall and a plurality of channels extending along said front wall,
   a phosphor screen along the inner surface of said front wall in each of said channels,
   means for generating and directing at least one beam of electrons along each of said channels along a path at least a portion of which extends toward said phosphor screen so that the beam will impinge on the phosphor screen, and
   means in each of said channels for deflecting the beam in the channel to scan the beams in alternate channels transversely completely across their respective channels in one transverse direction and simultaneously to scan the beams in the other channels transversely completely across their respective channels in the opposite transverse direction so that a composite line scan completely across the phosphor screen is obtained.

2. An electron display device comprising:
- an evacuated envelope having closely spaced, substantially parallel, front and back walls, and a plurality of spaced, substantially parallel support walls extending substantially perpendicularly between said front and back walls and forming a plurality of channels extending across said front and back walls,
- a phosphor screen along the inner surface of said front wall in each of said channels,
- means at one end of said channel for generating and directing at least one beam of electrons along each of said channels along a first path generally parallel to and along said front wall,
- means in each of said channels for selectively deflecting the beam in the channel out of its first path at selected points along the channel into second paths extending toward said phosphor screen so that the beam will impinge on the phosphor screen, and
- means in each of said channels for deflecting the beam in the channel as it moves along its second paths in a plane which traverses the first path of the beam so that the beam will scan the portion of the phosphor screen in the channel transversely across the channel with the beams in alternate channels being scanned across their respective channels in one transverse direction while the beams in the other channels are simultaneously scanned across their respective channels in the opposite transverse direction.

3. An electron display device in accordance with claim 2 in which the means in each channel for deflecting the beam as it moves along its second paths comprises a pair of deflection electrodes extending in spaced parallel relation between the first path of the beam and the phosphor screen and positioned so that the second paths of the beam extend between said deflection electrodes.

4. An electron display device in accordance with claim 3 in which each deflection electrode extends along a separate one of the support walls forming the sides of the respective channel.

5. An electron display device in accordance with claim 4 in which the deflection electrodes on both sides of each support wall are electrically connected together.

6. An electron display device in accordance with claim 5 including means whereby a potential of one polarity can be applied to the deflection electrodes on both sides of alternate support walls and a potential of the opposite polarity can be applied to the deflection electrodes on both sides of the other support walls.

7. An electron display device in accordance with claim 4 in which each of the deflection electrodes is a metal film on the support wall along which it extends.

8. An electron display device in accordance with claim 4 including a beam guide extending along the back wall in each of the channels, said beam guide being adapted to guide the electron beam along its first path but permitting the deflection of the beam into its second paths at spaced points along the beam guide.

9. An electron display device in accordance with claim 8 including means for generating and directing a plurality of beams of electrons into each of the channels, and a separate beam guide extending along each channel for each of the beams.

10. In an electron display device having an evacuated envelope with a front wall, a plurality of channels extending along the front wall and a phosphor screen along the inner surface of the front wall in each channel, the method of:
- generating and directing at least one beam of electrons along each of said channels along a path at least a portion of which extends toward said phosphor screen so that the beam will impinge of the screen.
- deflecting the beams in alternate channels transversely across their respective channels in one transverse direction, and
- simultaneously deflecting the beams in the other channels transversely across their respective channels in the opposite transverse direction.

* * * * *

UNITED STATES PATENT AND TRADEMARK OFFICE
CERTIFICATE OF CORRECTION

PATENT NO. : 4,117,368

DATED : September 26, 1978

INVENTOR(S) : Frank Jerome Marlowe et al.

It is certified that error appears in the above-identified patent and that said Letters Patent is hereby corrected as shown below:

In the Abstract, line 4,     "closed" should be --closely--.

Column 1, line 17,     "4,028,562" should be --4,028,582--.

*Signed and Sealed this*

*Twenty-seventh* Day of *March 1979*

[SEAL]

Attest:

RUTH C. MASON
*Attesting Officer*

DONALD W. BANNER
*Commissioner of Patents and Trademarks*